Dec. 20, 1966    J. L. BLAYNEY ET AL    3,293,656
VELOCITY MODULATED RECORDING LIGHT INTENSIFIER
Filed Oct. 7, 1964

INVENTORS
JAMES L. BLAYNEY
RALPH GILMAN
BY Samuel Lindenberg
ATTORNEY

United States Patent Office 3,293,656
Patented Dec. 20, 1966

3,293,656
VELOCITY MODULATED RECORDING LIGHT INTENSIFIER
James L. Blayney, Pacoima, and Ralph Gilman, Altadena, Calif., assignors to California Institute Research Foundation, Pasadena, Calif., a corporation of California
Filed Oct. 7, 1964, Ser. No. 402,079
8 Claims. (Cl. 346—109)

This invention relates to apparatus of the type which employs a moving beam of light for making recordings, such as a galvanometer, and more particularly to improvements therein.

In apparatus which employs a light beam for making a recording, such as the indicated galvanometer, usually a mirror is supported so that it can be vibrated by whatever forces or signals are applied thereto. A lamp is positioned so that light therefrom falls upon the mirror and is reflected from the mirror onto a moving recording surface, such as a film which is wrapped around a rotating drum. If the mirror moves rapidly, less light falls upon a given area of the recording surface than occurs when the mirror moves slowly. Thus, a recording of a high frequency signal which is applied to move the mirror is lighter than a recording of a low frequency signal. As a matter of fact, as the frequency of the signal applied to move the mirror increases, although the mirror will vibrate adequately with the frequency applied thereto, because of the reduction in the amount of light falling on the recording surface except at those locations where the mirror reverses direction of motion, the recording trace between the extremes is so light to be indistinguishable so that for the higher frequency all that is seen is substantially a grey rectangle while for the relatively lower frequencies, the individual wave shape trace can be seen.

Attempts to cure this by either increasing the sensitivity of the recording medium or increasing the intensity of the light being reflected thereon does serve to extend the usable frequency range of a galvanometer in the high frequency direction. However, because of the overexposure which occurs on the low frequency range, the recorded wave shapes are blurred on the low frequency range and thus one has to sacrifice low frequency bandwidth to obtain some high frequency bandwidth.

An object of the present invention is to provide an arrangement for maintaining substantially constant the amount of light which falls on a recording medium, and apparatus of the type described, regardless of the speed at which the mirror is moved.

Another object of the present invention is the provision of a novel arrangement for compensating for changes in velocity of a recording light beam in apparatus of the type described.

Still another object of the present invention is the provision of a novel, useful arrangement for modulating the intensity of a recording light source in accordance with the velocity of the mirror reflecting light from said source onto a recording medium.

These and other objects of the invention may be achieved in an arrangement wherein light is derived from the moving mirror which directs light from a light source onto a recording surface. The derived light has an amplitude which is a function of the deflected position of the moving mirror. This is converted into an electrical signal which is differentiated, then rectified, and then applied to control the intensity of the light source used for making a recording. Accordingly, the higher the frequency of vibration of the mirror, the brighter the illumination received from the recording light source. The slower the vibration of the mirror, the recording brightness is made less.

The novel features that are considered characteristic of this invention are set forth with particularly in the appended claims. The invention itself both as to its organization and method of operation, as well as additional objects and advantages thereof, will best be understood from the following description when read in connection with the accompanying drawings, in which:

While the embodiment of the invention will be shown and described as an improvement on a moving mirror type of galvanometer, it is to be understood that this is by way of example only, and should not be considered as a limitation upon the invention. Those skilled in the art will appreciate that the techniques taught herein are usable for other types of instruments in which the problem of achieving a usable recording from a light beam which is moved at varying velocities is presented.

Figure 1:
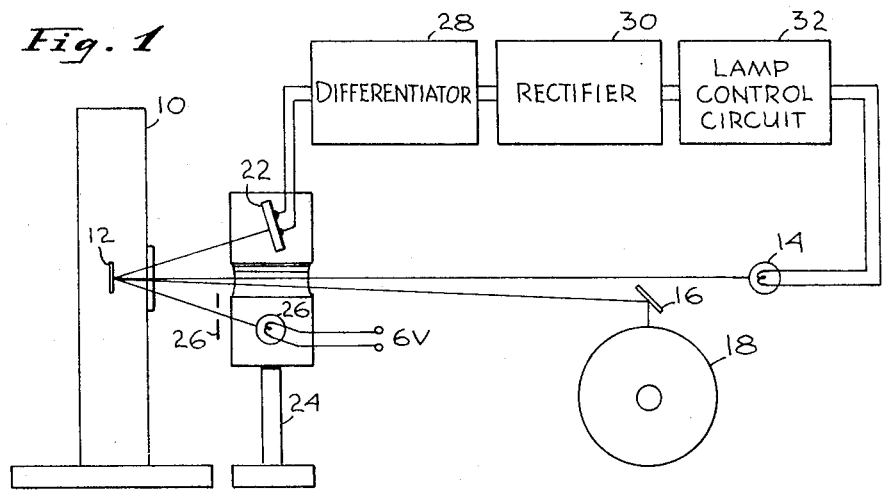
FIGURE 1 is a block diagram of an arrangement in accordance with this invention.

Referring now to FIGURE 1, a galvanometer will normally have a stand 10 which supports a mirror 12 in a manner (not shown), so that the mirror can be vibrated or moved in response to signals applied to the deflecting coil (not shown) of the galvanometer. The mirror support normally is such that the mirror pivots about an axis in response to the electrical signals applied to the galvanometer.

A recording light source 14 is also provided in a galvanometer, and its light output is permitted to shine on the galvanometer mirror 12. The light reflected from the moving mirror 12 is directed onto a stationary mirror 16 which in turn reflects the light onto the surface of a recording drum 18, upon which a recording medium may be placed.

As thus far described, the galvanometer structure is conventional and well known. There is provided in accordance with this invention an additional light source 20 and a photosensitive cell 22, both of which may be supported upon a suitable stand 24 in the manner shown adjacent the reflecting surface of the moving mirror 12, and so as not to interfere with the path of the light from the recording light source 14 and from the moving mirror 12 to the stationary mirror 16. The photosensitive cell 22 may be, for example, a solar cell. A mask 26 has a slot therethrough which permits light from the source 20 to shine on the mirror 12 when in a quiescent state and to be reflected onto the photosensitive cell 22. The opening in the mask 26 is such that the substantially rectangular area of the cell 22 is half filled by the rectangularly focussed beam from the mirror 12 such that the signal output from the photosensitive cell varies directly with the deflection amplitude.

The output of the photosensitive cell is applied to a differentiator arrangement 28. The operation of a differentiator, as is well known, will have an amplitude which is a function of the rate of change of the input signal, varying directly therewith.

The output of the differentiator 28 is then applied to a rectifier arrangement 30 wherein it is converted to a unidirectional signal. The output of the rectifier 30 is then applied to a lamp control circuit 32 which effectively determines the amount of current supplied to the lamp 14 in response to the rectified signal. Therefore, the light output of the lamp 14 varies directly with the velocity of the vibrating mirror and the higher the frequency applied to cause the mirror to vibrate the higher the intensity of the light emitted by the light source 14 during the high velocity portions of the cycles. Accordingly, the system described herein operates to modulate the recording light with the velocity of the moving mirror 12 so that the amount of light which is reflected onto the recording medium is increased with increase in velocity of the mirror to compensate for the effects of such increase in velocity.

Figure 2:
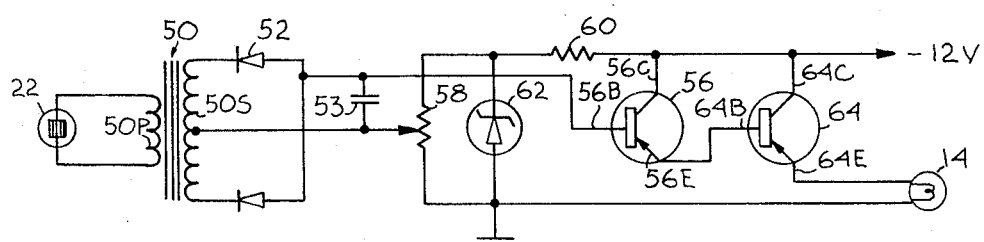
FIGURE 2 is a circuit diagram exemplifying certain circuitry of the type represented by block diagrams in FIGURE 1.

FIGURE 2 is a circuit diagram which exemplifies a preferred arrangement of the circuitry represented by the rectangles 28, 30, 32 in FIGURE 1. The photosensitive cell 22 is connected across the primary winding 50P of a transformer 50. The transformer 50 has a center tap secondary winding 50S. The transformer operates to differentiate the input signal from the photosensitive cell, since the lower the frequency of the input signal, the lower the voltage output which is induced across the secondary winding, and conversely the higher the signal input, the higher the voltage which is induced across the secondary winding. Diodes 52, 54 have their cathodes connected to opposite ends of the secondary winding 50S and their anodes connected together in the usual rectifier configuration. The connected together anodes of the diodes are connected to the base electrode 56B of a transistor 56. The center tap of the secondary winding is connected to the movable arm of a potentiometer 58. One end of the potentiometer resistor is connected to ground and the other end is connected through a second resistor 60 to an operating potential source. A zener diode 62 is connected across the resistor of the potentiometer 58 for the purpose of insuring a substantial consistency of the voltage which is applied to the transistor 56 and to another transistor 64.

The collector 56C of transistor 56 is connected to the operating potential source, the emitter 56E of transistor 56 is connected to the base 64B of transistor 64. The collector 64C of transistor 64 is connected to the operating potential source and the emitter 64E of the transistor 64 is connected to one end of the filament of the recording lamp 14, the other end of which is connected to ground. A capacitor 53 is connected between the junction of the diodes 52, 54 and the movable arm of the potentiometer 58.

The capacitor 53 and the transformer 50 are selected in accordance with the recording frequency range and recording drum speed desired to be covered. The potentiometer 58 is adjusted for the quiescent lamp brightness since its setting is fed to the base of the transistors 56 in a path through the secondary winding 50S and the diodes 52, 54. The variations in potential which are introduced through the transformer 50 are added to the quiescent voltage level and thus serve to increase the lamp brightness with increase in velocity of the mirror.

Figure 3:
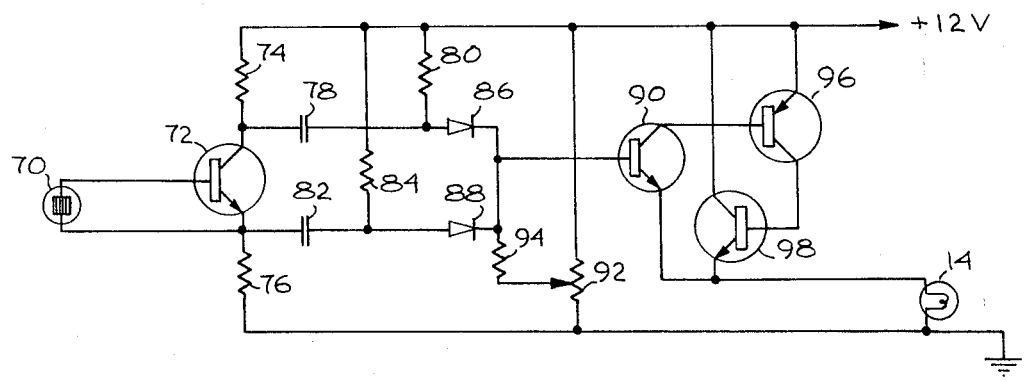
FIGURE 3 is a circuit diagram of another embodiment of the circuitry shown by block diagrams in FIGURE 1.

FIGURE 3 is a circuit diagram of another embodiment of the invention which does not use a transformer. A photosensitive cell 70 performs the same function as the cell 22 in FIGURE 2. Its output is applied to the base of transistor 72. The collector of transistor 72 is connected through a resistor 74 to a source of operating potential and the emitter of transistor 72 is also connected to the operating potential source through a resistor 74. Transistor 72 serves to amplify the output of the photosensitive cell 70 and applies its output to two differentiating circuits.

The capacitor 78 and resistor 80 constitute one differentiating circuit and capacitor 82 and resistor 84 constitute the other differentiating circuit. Capacitor 78 is connected between the collector of transistor 72 and one end of resistor 80. The other end of resistor 80 is connected to the operating potential source. Capacitor 82 is connected between the emitter of transistor 72 and one end of resistor 84. The other end of resistor 84 is connected to the operating potential source.

A first and a second diode, respectively 86, 88, rectify the differentiating circuit outputs. Diode 86 is connected between the junction of capacitor 78 and resistor 80 and the base of a transistor 90. Diode 88 is connected between the junction of capacitor 82 and resistor 84 and the base of transistor 90.

A potentiometer 92, connected across the potential source, serves the same function as is served by potentiometer 58 in FIGURE 2; namely, setting the quiescent lamp brightness. The movable arm of the potentiometer is connected to the base of transistor 90 through a resistor 94.

The collector of transistor 90 is connected to the base of a transistor 96. The emitter of transistor 90 is connected to the emitter of a transistor 98, and also to one side of the filament of lamp 14. The collector of transistor 96 is connected to the base of transistor 98. The collector of transistor 98 and the emitter of transistor 96 are both connected to the operating potential source. The other end of the filament of lamp 14 is connected to ground. It should be apparent that the current passing through the lamp 14 is under the control of the three transistors with transistor 90 controlling transistors 96 and 98.

The operation of the circuit shown in FIGURE 3 is substantially identical to that described for FIGURE 2. The transformer is eliminated and in its place a phase splitter transistor and differentiating circuits are used for accomplishing the functions provided by the transformer.

There has accordingly been described and shown herein a novel, useful arrangement for compensating for changes in light level of a recording light beam with variations in velocity of said light beam.

What is claimed is:

1. In apparatus of the type wherein light from a source of light is directed onto a movable mirror to be redirected onto a recording medium, said movable mirror being moved responsive to signals whose wave form is desired to be recorded on said recording medium, the improvement comprising a light-to-electrical transducer, means for illuminating said light-to-electrical transducer with light reflected from said mirror for generating an electrical signal having an amplitude increasing with the angular velocity of said mirror, and means for varying the intensity of said light source with said electrical signal for compensating for the effects of changes in velocity of said moving mirror on said recording medium.

2. In apparatus as recited in claim 1 wherein said light-to-electrical signal transducer comprises a solar cell which has only a portion of its light receiving surface illuminated from said movable mirror when said movable mirror is in its quiescent state.

3. In apparatus of the type wherein light from a source of light is directed onto a movably supported mirror to be redirected therefrom onto a recording medium, and said movable mirror is deflected in response to signals which are desired to be recorded on said recording medium, means for compensating for the effects of increases in velocity of said movable mirror on said recording medium comprising light-to-electrical signal converting means, an auxiliary light source, means for directing light from said auxiliary light source onto said moving mirror to be redirected thereby onto said light-to-electrical signal transducing means to cause it to generate an electrical signal output having an amplitude which is a function of the displacement of said moving mirror, differentiating circuit means, means for applying the output of said light-to-electrical signal transducing means to said differentiating circuit means, rectifier means connected to said differentiating circuit means for rectifying the signal received therefrom and amplifier means for controlling the intensity of said light source responsive to the output of said rectifier means for compensating for the effects of increases in velocity of motion of said moving mirror on said recording medium.

4. Apparatus as recited in claim 3 wherein said differentiating circuit means comprises a transformer having a primary and a secondary winding, said primary winding being coupled to said light-to-electrical signal transducing means and said secondary winding being connected to said rectifier means.

5. Apparatus as recited in claim 4 wherein said differentiating circuit means comprises a network including a capacitor, and a resistor connected to one end of said capacitor, said capacitor other end being connected to receive said light-to-electrical signal transducing means output, and said rectifier means being connected to said one end of said capacitor.

6. In apparatus as recited in claim 3 wherein said light-to-electrical signal transducer comprises a photosensitive cell, an auxiliary light source, and means for positioning said auxiliary light source and photosensitive cell relative to said moving mirror to illuminate said photosensitive cell with light reflected from said moving mirror which is received from said auxiliary light source.

7. In apparatus of the type wherein light from a source of light is directed onto a movably supported mirror to be redirected therefrom onto a recording medium, and said movable mirror is deflected in response to signals which are desired to be recorded on said recording medium, means for compensating for the effects of increases in velocity of said movable mirror on said recording medium comprising a photosensitive cell, an auxiliary light source, and means for positioning said auxiliary light source and photosensitive cell relative to said moving mirror to illuminate said photosensitive cell with light reflected from said moving mirror which is received from said auxiliary light source, a transformer having a primary winding and a center tap secondary winding, means connecting said photosensitive cell to said transformer primary winding, first and second rectifier means, means respectively connecting said first and second rectifier means to opposite ends of said secondary winding, a transistor having a base collector and emitter electrode, means connecting said first and second rectifier means to the base of said transistor, a source of operating potential, means connecting the collector of said transistor to said source of operating potential, means coupling said source of light between said emitter and said source of operating potential to be controlled responsive to current flowing through said transistor collector and emitter, and means for establishing a quiescent illumination level for said source of light comprising a potentiometer having a resistance and a slider movable along said resistance, means connecting said resistance across said source of operating potential, and means connecting said potentiometer slider to the center tap of said transformer second winding.

8. In apparatus of the type wherein light from a source of light is directed onto a movably supported mirror to be redirected therefrom onto a recording medium, and said movable mirror is deflected in response to signals which are desired to be recorded on said recording medium, means for compensating for the effects of increases in velocity of said movable mirror on said recording medium comprising a photosensitive cell, an auxiliary light source, and means for positioning said auxiliary light source and photosensitive cell relative to said moving mirror to illuminate said photosensitive cell with light reflected from said moving mirror which is received from said auxiliary light source, a first transistor having a base, emitter and collector electrodes, a source of operating potential, means coupling said photosensitive cell to said first transistor base, a first resistor connected between said first transistor collector and said source of operating potential, a second resistor connected between said first transistor emitter and said source of operating potential, a first capacitor having one end connected to said first transistor collector, a third resistor connected between said source of operating potential and the other end of said first capacitor, a second capacitor having one end connected to said first transistor emitter, a fourth resistor connected between said source of operating potential and the other end of said second capacitor, a second transistor having base, emitter and collector electrodes, a first rectifier connected between the other end of said first capacitor and said second transistor base, a second rectifier connected between the other end of said second capacitor and said second transistor base, potentiometer means for applying a potential from said source of operating potential to said second transistor base for establishing a quiescent illumination level for said source of light, means connecting the emitter of said second transistor to said source of light, and means coupling the collector of said second transistor to said source of operating potential.

References Cited by the Examiner
UNITED STATES PATENTS 2,415,880  2/1947  Hassler _____ 346—109
2,958,010  10/1960 Carter et al. _____ 346—109 X RICHARD B. WILKINSON, *Primary Examiner*, J. W. HARTARY, *Assistant Examiner*.